United States Patent [19]

Enokizono

[11] Patent Number: 4,710,869
[45] Date of Patent: Dec. 1, 1987

[54] KEY INPUT DATA EMULATION SYSTEM

[75] Inventor: Takatoshi Enokizono, Tokyo, Japan

[73] Assignee: Kabushiki Kaisha Toshiba, Kawasaki, Japan

[21] Appl. No.: 705,729

[22] Filed: Feb. 26, 1985

[30] Foreign Application Priority Data

Feb. 29, 1984 [JP] Japan .................................. 59-37516

[51] Int. Cl.[4] .............................................. G06F 7/00
[52] U.S. Cl. ..................................... 364/200; 364/709
[58] Field of Search ... 364/200 MS File, 900 MS File, 364/709; 340/365 R

[56] References Cited

U.S. PATENT DOCUMENTS

| | | | |
|---|---|---|---|
| 4,377,852 | 3/1983 | Thompson | 364/900 |
| 4,453,211 | 6/1984 | Askinazi et al. | 364/200 |
| 4,458,311 | 7/1984 | Clements et al. | 364/200 |

Primary Examiner—David Y. Eng
Attorney, Agent, or Firm—Cushman, Darby & Cushman

[57] ABSTRACT

In a keyboard emulation system of the invention, a keyboard emulation circuit is inserted beteen two microprocessors. The keyboard emulation circuit generates a signal for sequentially scanning a key switch matrix constituting a keyboard unit. The keyboard emulation circuit has a keyboard controller of a matrix scan type for generating a key input code by a return signal, a register for setting a key input code by a master microprocessor, and a comparator for receiving an output from the register and a scan signal for comparing them. The master processor emulates a keyboard interface of the slave processor and performs a key input to the slave processor by the keyboard connected to the master processor.

7 Claims, 16 Drawing Figures

| D7 | D6 | D5 | D4 | D3 | D2 | D1 | D0 |
|----|----|----|----|----|----|----|----|
| CNTL | SHIFT | SCAN | | | RETURN | | |

| D7 | D6 | D5 | D4 | D3 | D2 | D1 | D0 |
|----|----|----|----|----|----|----|----|
| KB ENB | NOTUSE | X-KB CODE | | | Y-KB CODE | | |

| D7 | D6 | D5 | D4 | D3 | D2 | D1 | D0 |
|----|----|----|----|----|----|----|----|
| KD ENB | | KD5 | KD4 | KD3 | KD2 | KD1 | KD0 |

| D7 | D6 | D5 | D4 | D3 | D2 | D1 | D0 |
|----|----|----|----|----|----|----|----|
| | | | | | SHIFT | CONT-ROL | BREAK |

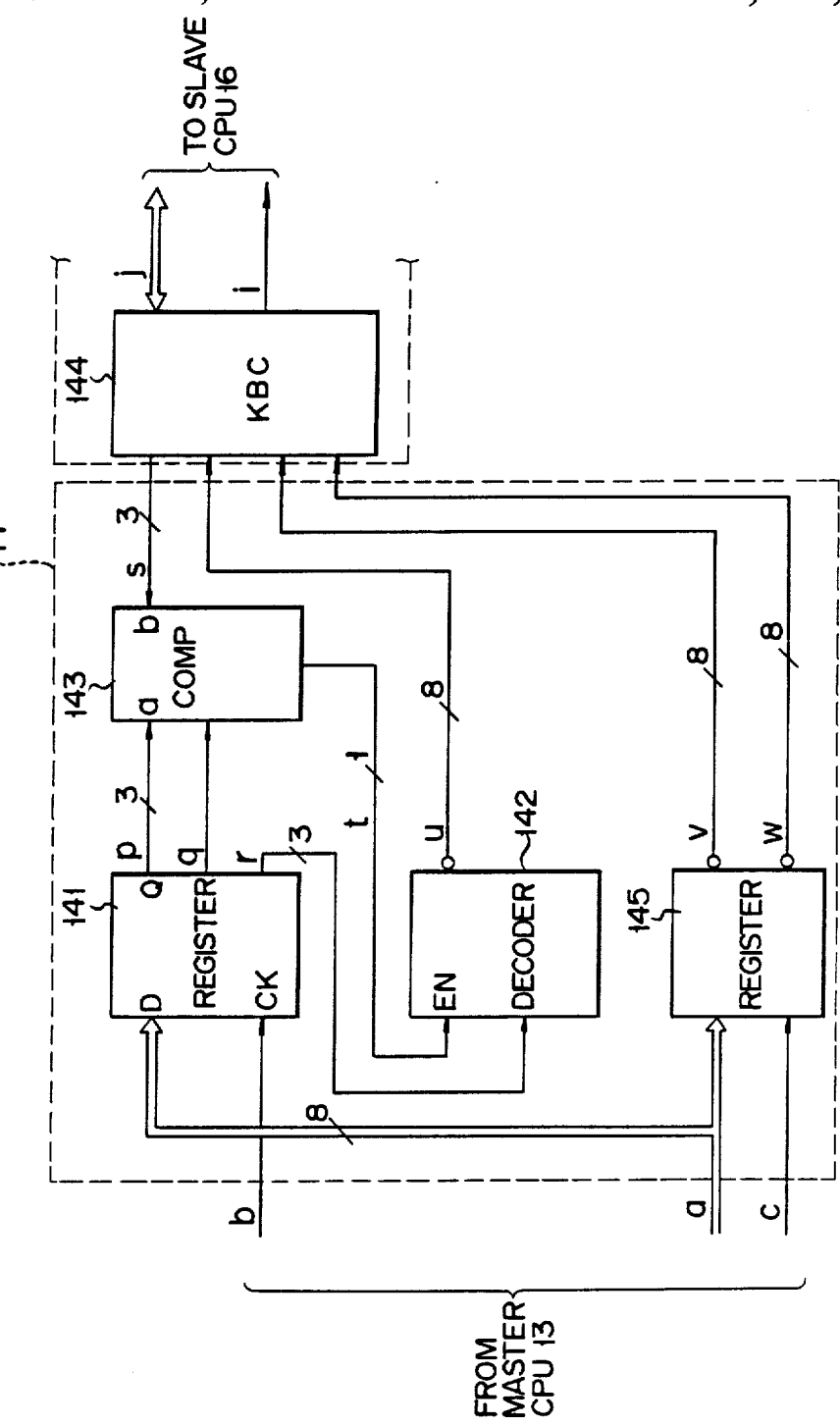
F I G. 2

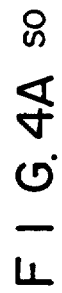
FIG. 4A S0
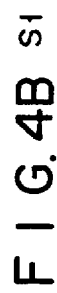
FIG. 4B S1
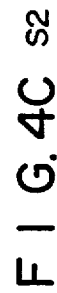
FIG. 4C S2
FIG. 7A K0
FIG. 7B K1
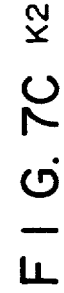
FIG. 7C K2
FIG. 7D K3
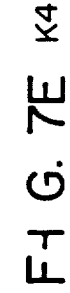
FIG. 7E K4
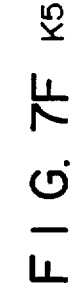
FIG. 7F K5

KEY INPUT DATA EMULATION SYSTEM

BACKGROUND OF THE INVENTION

The present invention relates to a key input data emulation system in a key input processing system, which uses a single keyboard unit to provide independent key input data to a plurality of microprocessors.

Construction of a high-performance computer system using two independent microprocessors which are connected to separate I/O devices is known. For example, a system having a high-performance personal business computer with 16-bit architecture and a personal game computer with 8-bit architecture can be used in a variety of applications. This system can also improve data processing and transfer efficiency. Such interprocessor coupling is known and can be easily achieved by organically coupling LSI chips. In such a system, two microprocessors are connected to a common I/O device in order to effectively utilize available equipment. In another known system, a single keyboard unit is used to supply independent key input data to two microprocessors.

The present invention is directed to a novel interface structure for supplying independent key input data to a plurality of microprocessors from a single keyboard unit.

SUMMARY OF THE INVENTION

It is an object of the present invention to provide a key input data emulation system wherein a keyboard unit can be controlled by a master processor only and key input data can be supplied to a slave processor through the master processor, so that a single keyboard unit can supply key input data to both the master and slave processors to thereby simplify the system configuration and reduce the cos.

In order to achieve the above object of the present invention, there is provided a key data emulation system comprising:

a single keyboard unit having a group of various key switches arranged in an X-Y matrix;

a master keyboard interface, connected to the keyboard unit, for transferring a key code input from the keyboard unit to a master processor;

the master processor, connected to the master keyboard interface, for receiving the code input from the keyboard unit through the master keyboard interface;

emulation circuit means connected to the master processor, including:

a register for holding X-Y key input codes supplied from the master processor, a comparator for comparing the X key input code from the register and a scan signal from a slave keyboard interface and for outputting a comparison coincidence signal, and a decoder for decoding the Y key input code from the register using the comparison coincidence signal as an enable signal and for outputting a decoded signal to the slave keyboard interface as a return signal;

the slave keyboard interface, connected to the emulation circuit means, for outputting a keyboard scan signal to the emulation circuit means; and a slave processor, connected to the slave keyboard interface, for reading the input key codes through the slave keyboard interface in response to an interrupt signal from the slave keyboard interface.

BRIEF DESCRIPTION OF THE DRAWINGS

Other objects and features of the present invention will be apparent from the following description taken in connection with the accompanying drawings, in which:

FIG. 2 is a detailed block diagram of a key input data emulation circuit shown in FIG. 1;

FIGS. 4A through 4C are timing charts of scan signals;

FIGS. 7A through 7F are timing charts of scan signals.

DETAILED DESCRIPTION OF THE PREFERRED EMBODIMENT

Figures 1, 3A, 3B, 6A, 6B:
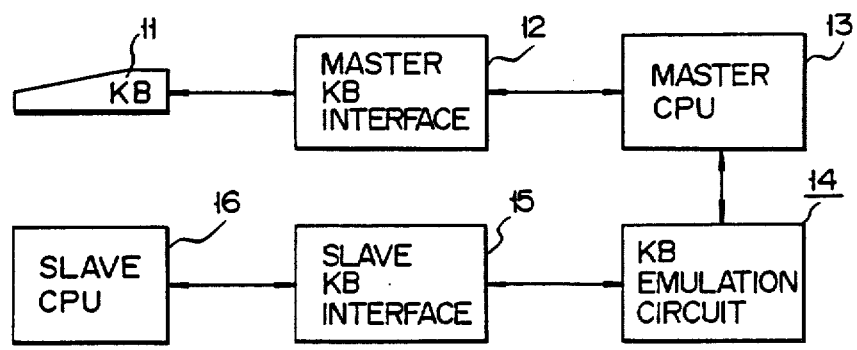
FIG. 1 is a block diagram showing the configuration of a key input processing system to which a key input data emulation system according to the present invention is applied.
FIGS. 3A and 3B respectively show formats of a key input data set in a register of the embodiment shown in FIG. 2.
FIGS. 6A and 6B respectively show formats of a key input data set in a register in the embodiment shown in FIG. 5.

FIG. 1 is a schematic block diagram of a key data emulation system according to the present invention. As can be seen from FIG. 1, a single keyboard unit (KB) 11 is connected to a master central processing unit (CPU) 13 through a master keyboard (KB) interface 12. The master CPU 13 is also connected to a keyboard (KB) emulation circuit 14. The KB emulation circuit 14 is connected to a slave central processing unit (CPU) 16 through a slave keyboard (KB) interface 15.

The KB 11 has a group of various switches arranged in an X-Y matrix. The KB 11 also has a microprocessor (not shown). When any key switch is depressed, the internal microprocessor detects X-Y matrix data corresponding to the depressed key switch, converts the data into serial data and sends the serial data to the master KB interface 12 of the master CPU 13.

A system program prestored in the master CPU 13 defines whether each received keyboard data element is used either by the master or slave CPU 13 or 16. For example, when the user depresses a function key on the KB 11, the master CPU 13 decodes corresponding key input data in accordance with the system program and determines if the data is retained at the master CPU 13 or sent to the slave CPU 16.

This embodiment will be described with reference to a case wherein key input data from the KB 11 is to be supplied to the slave CPU 16. The master CPU 13 supplies the key input data supplied from the KB 11 to the slave CPU 16 through the KB emulation circuit 14 and the slave KB interface 15. The slave KB interface 15 supplies sequential keyboard scan signals to the KB emulation circuit 14 and supplies a read request to the slave CPU 16 upon detecting corresponding key input data. As a result, the slave CPU 16 reads the corresponding key input data from the KB emulation circuit 14 through the interface 15.

FIG. 2 shows an embodiment of the keyboard emulation circuit shown in FIG. 1. In this embodiment, Model 8279 available from Intel, U.S.A. is used as a keyboard controller. A register 141 is an 8-bit register in which key input data on an 8-bit data bus a connected to the master CPU 13 is set. Data is set in the register 141 by a keyboard data set command supplied from the master CPU 13 through a line b. A keyboard controller (KBC) 144 in the interface 15 supplies an X-Y key matrix scan signal to the KB emulation circuit 14 through a 3-bit line s and receives a return signal fed back from the KB emulation circuit 14 through 8-bit lines u, v and w. The KBC 144 checks the return signals to determine if any key input data is to be supplied to the slave CPU 16. When key input data is to be supplied to the slave CPU 16, the KBC 144 supplies an interrupt signal to the CPU 16 through a line i. The slave CPU 16 is thus signalled that there is key input data and reads out the data from the KBC 144. A comparator 143 compares key input data (3-bit X key code) as a Q output from the register 141 supplied through a line p, with the scan signal from the KBC 144. The comparator 143 supplies a comparison result as a decode enable signal to the decoder 142 through a line t by a keyboard enable signal as a $\overline{Q}$ output from the register 141 received through a line q. The decoder 142 decodes a Y key code supplied from the register 141 through a line r, and feeds back the decoded signal as an 8-bit return signal to the KBC 144 through a line u.

Control and shift information such as data on a control key, a shift key or the like arranged on the X-Y key matrix information are set in a register 145 from the master CPU 13 through the data bus a. Data is set in the register 145 by a data set command supplied from the master CPU 13 through a line c. Control and shift information from the register 145 are set at bits 7 and 6, respectively, of the FIFO register in the KBC 144 through lines v and w, respectively.

The mode of operation of this embodiment will be described below. It is assumed that the key input data mode in the slave CPU 16 is set by the system program. When a given key on the KB 11 is depressed, the master CPU 13 detects a corresponding key code. The master CPU 13 converts the detected key code into 8-bit key code bits D0 through D7 as shown in FIG. 3B and sets them in the register 141. The master CPU 13 also supplies a key code enable command as a $\overline{Q}$ output from the register 141 to the comparator 143 through a line q. Thus, the comparator 143 is enabled.

Meanwhile, an initialization command is supplied to the KBC 144 from the slave CPU 16 through a data bus j. Then, the internal keyboard control logic of the KBC 144 starts to operate. The KBC 144 sequentially produces 3-bit binary counter output signal bits S0 through S2 as shown in FIGS. 4A through 4C through a line s as a keyboard scan signal. A maximum of 8 X input key codes can be addressed using this scan signal.

The comparator 143 compares the X key code bits D3 through D5 supplied from the master CPU 13 with the scan signal bits S0 through S2 from the KBC 144. When these input signals coincide, the comparator 143 supplies a comparison coincidence signal as an enable signal to an enable terminal EN of the decoder 142 through a line t. The decoder 142 also receives a Y key code from the register 141 through the line r. Then, the decoder 142 decodes the Y key code and feeds back the decoded output signal as a return signal having the format shown in FIG. 3A to the KBC 144 through the line u. Upon reception of this signal, the KBC 144 is signalled that a key has been depressed and stores the scan signal corresponding to the received code in an internal buffer (not shown). The KBC 144 also supplies an interrupt signal to the slave CPU 16 through the line i. The slave CPU 16 reads the corresponding key input data from the KBC 144.

Processing of a function key will be described below. A description will be made with reference to the case of a function key code shown in FIG. 3A. When one of the function keys is transmitted from the KB 11, the function key code of the format as shown in FIG. 3A is set in the register 145. If the received data is control information, the register 145 supplies it to the KBC 144 through the line v. However, if the received data is shift information, the register 145 supplies it to the KBC 144 through the line w. These pieces of information are respectively set at bits 7 and 6 of the FIFO register of the KBC 144. When the key code is stored in the FIFO register, the KBC 144 supplies an interrupt signal to the slave CPU 16 through the line i. As a result, the slave CPU 16 reads the corresponding key code from the KBC 144.

Figure 5:
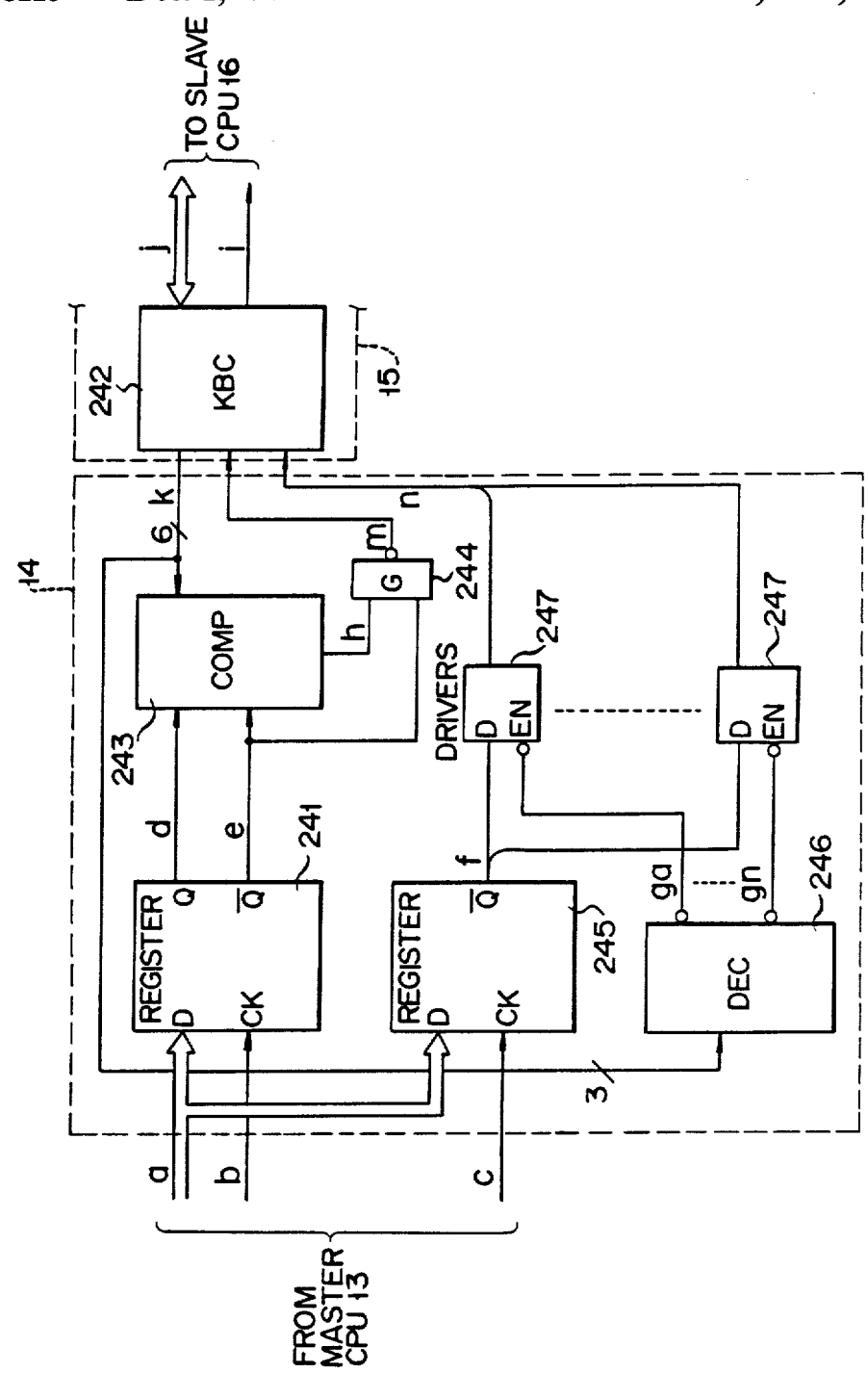
FIG. 5 is a detailed block diagram of another example embodiment of the key input data emulation circuit shown in FIG. 2.

FIG. 5 shows another embodiment of the KB emulation circuit shown in FIG. 1. A register 241 is an 8-bit register for setting key input data on a data bus a connected to a master CPU 13. Data is set in the register 241 by a keyboard data set command supplied from the master CPU 13 through a line b. A keyboard controller (KBC) 242 inside a slave keyboard (KB) interface 15 supplies an X-Y key matrix scan signal to a keyboard (KB) emulation circuit 14 through a line k and receives a return signal fed back from the KB emulation circuit 14 through lines m and n. The KBC 242 checks the return signal to determine if there is any key input data to be supplied to a slave CPU 16. When there is key input data to be supplied to the slave CPU 16, the KBC 242 supplies an interrupt signal to the slave CPU 16 through a line i. In response to this, the slave CPU 16 is signalled that key input data must be supplied thereto and reads this data from the KBC 242. A comparator 243 compares key input data as a Q output from the register 241 supplied through a line d with a scan signal supplied from the KBC 242.

The comparator 243 supplies a comparison coincidence signal as an enable signal to a NAND gate 244 through a line h. The NAND gate 244 also receives inverted key input data as a $\overline{Q}$ output from the register 241 through a line e. Thus, the NAND gate 244 supplies the key input data as a return signal to the KBC 242 through a line m.

Function codes of a control key, a break key, or a shift key arranged on the X-Y key matrix are held in a register 245. Data is set in the register 245 by a data set command supplied from the master CPU 13 through a line c. A decoder 246 receives the lower 3 bits of the X-Y key matrix scan signal supplied from the KBC 242 through a line k. The decoder 246 decodes the input 3 bits to determine which key among the shift key, the control key and the break key has been depressed. Drivers 247 receive the function key input data signal as a $\overline{Q}$ output from the register 245 and the function key scan address signal through a line f and lines ga through gn and produce function key detection signals through a line n. The respective outputs from the drivers 247 are wired-ORed and supplied to the KBC 242 as a return signal.

The mode of operation of the embodiment will be described below. It is assumed that the key input data mode to the slave CPU 16 is set by the system program. When a given key on the KB 11 is depressed, the master CPU 13 receives the corresponding key code. Then, the master CPU 13 converts the detected key code into 6-bit key code bits KD5 through KD0 shown in FIG. 6A and sets them in the register 241. The master CPU 13 supplies a key code enable command as a $\overline{Q}$ output from the register 241 to the comparator 243 through a line e. The comparator 243 is thus enabled.

An initialization command is supplied to the KBC 242 from the slave CPU 16 through a data bus j. The internal keyboard control logic of the KBC 242 starts to operate. The KBC 242 sequentially produces 6-bit binary counter output signal bits K5 through K0 as shown in FIGS. 7A through 7F as a keyboard scan signal through a line k. A maximum of 64 key codes can be addressed using this scan signal.

The comparator 243 compares the key code bits KD5 through KD0 supplied from the master CPU 13 with the scan signal bits K5 through K0 from the KBC 242. When the input signal bits coincide, the comparator 243 supplies a comparison coincidence signal to the NAND gate 244 through a line h. The NAND gate 244 receives a keyboard enable signal as a $\overline{Q}$ output from the register 241 through a line e. The NAND gate 244 supplies the comparison coincidence signal to the KBC 242 through the line m. Upon receiving this signal, the KBC 242 is signalled that a key has been depressed and stores a scan signal corresponding to the depressed key in an internal buffer (not shown). The KBC 242 supplies an interrupt signal to the slave CPU 16 through the line i. The slave CPU 16 reads the corresponding key input data from the KBC 242.

Processing of a function key will be described below. A description will be made with reference to the case of the function key code shown in FIG. 6B. When one of function codes is sent from the KB 11, the function key code of the function key format as shown in FIG. 6B is set in the register 245. The upper 3 bits K5 through K3 of the scan signal are supplied to a decoder 246 through the line k. The decoder 246 produces scan addresses corresponding to the respective function keys. If one of the function key codes is set in the register 245, the function key detection signal is supplied to the KBC 242 through the drivers 247 via the line n by scan addresses ga through gn. The KBC 242 detects the function key code, adds the function corresponding to the received key code, and generates 8-bit key code data. The KBC 242 then interrupts the slave CPU 16 through the line i. The interrupted slave CPU 16 reads the 8-bit function key code data from the KBC 242.

What is claimed is:

1. A key input data emulation system comprising:
   a single keyboard unit having key switches arranged in an X-Y matrix for generating, when depressed, an X key input code and a Y key input code corresponding to the depressed key switch;
   master processing means responsive to said X and Y key input codes for selectively transmitting said X and Y key input codes;
   slave processing means for reading data corresponding to said X and Y key input codes in response to an interrupt signal;
   a keyboard emulation circuit responsive to said X and Y key input codes from said master processing means, including:
     register means for holding said X and Y key input codes from said master processing means,
     comparator means for comparing the X key input code from said register means and a keyboard scan signal and for outputting a comparison coincidence signal when said X key input code and said keyboard scan signal are coincident, and
     a decoder for decoding the Y key input code from said register means using the comparison coincidence signal as an enable signal, said decoder outputting a decoded signal as a return signal; and
   slave keyboard interface means for: (1) outputting said keyboard scan signal to said comparator means to read the corresponding X and Y key input codes, (2) determining in response to said return signal from said decoder whether said X and Y key input codes are being presented by said master processing means to said keyboard emulation circuit, and (3) supplying said interrupt signal and said data corresponding to said X and Y input codes to said slave processing means if said X and Y key input codes are present.

2. A system according to claim 1, wherein said master processing means produces control information and shift information, said keyboard emulation circuit further including a second register for holding said control information and said shift information supplied from said master processing means and for supplying said control information and said shift information to said slave keyboard interface means.

3. A system according to claim 1, further comprising a master keyboard interface for transferring said X and Y key input codes from said single keyboard unit to said master processing means.

4. A key input data emulation system comprising:
   a single keyboard unit having key switches arranged in an X-Y matrix for generating, when depressed, an X key input code and a Y key input code corresponding to the depressed key switch;
   master processing means responsive to said X and Y key input codes for selectively transmitting said X and Y key input codes;
   slave processing means for reading data corresponding to said X and Y key input codes in response to an interrupt signal;
   a keyboard emulation circuit responsive to said X and Y key input codes from said master processing means, including:
     register means for holding said X and Y key input codes from said master processing means,
     comparator means for comparing the X and Y key input codes from said register means and a keyboard scan signal and for outputting a comparison coincidence signal when said X and Y key input codes and said keyboard scan signal are coincident, and
     a gate receiving as a first input said X and Y key input codes from said register means and as a second input said comparison coincidence signal, said gate outputting said X and Y key input codes from said register means when said comparison coincidence signal is present; and
   slave keyboard interface means for: (1) outputting said keyboard scan signal to said comparator means to read the corresponding X and Y key input codes, (2) determining whether said X and Y key input codes are being presented by said master processing means to said keyboard emulation circuit, and (3) supplying said interrupt signal and said data corresponding to said X and Y key input codes to said slave processing means if said X and Y key input codes are present.

5. A system according to claim 4, wherein some of said key switches are control switches, said master processing means producing control key codes when said control switches are depressed, said keyboard emulation circuit further including:
- a second register means for holding said control key codes supplied from said master processing means and for supplying said control key codes to said slave keyboard interface means; and
- a decoder for decoding said keyboard scan signal from said slave keyboard interface means and for outputting to said slave keyboard interface means a signal indicating which of said control keys is depressed.

6. A system according to claim 5, wherein said control keys include a shift key, a control key, and a break key.

7. A system according to claim 4, further comprising a master keyboard interface for transferring said X and Y key input codes from said single keyboard unit to said master processing means.

* * * * *